(12) United States Patent
Kim et al.

(10) Patent No.: US 10,079,479 B2
(45) Date of Patent: Sep. 18, 2018

(54) MODULE EXTRACTION APPARATUS OF HIGH VOLTAGE DIRECT CURRENT SYSTEM

(71) Applicant: HYOSUNG CORPORATION, Seoul (KR)

(72) Inventors: June-Sung Kim, Anyang-si (KR); Hong-Ju Jung, Seoul (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 86 days.

(21) Appl. No.: 15/103,439

(22) PCT Filed: Dec. 24, 2014

(86) PCT No.: PCT/KR2014/012861
§ 371 (c)(1),
(2) Date: Jun. 10, 2016

(87) PCT Pub. No.: WO2015/102306
PCT Pub. Date: Jul. 9, 2015

(65) Prior Publication Data
US 2016/0294166 A1 Oct. 6, 2016

(30) Foreign Application Priority Data
Dec. 30, 2013 (KR) .................. 10-2013-0167881

(51) Int. Cl.
*H02B 11/127* (2006.01)
*H02J 1/10* (2006.01)
(Continued)

(52) U.S. Cl.
CPC .............. *H02B 11/127* (2013.01); *H02J 1/00* (2013.01); *H02J 1/10* (2013.01); *H02M 7/003* (2013.01); *H02B 11/173* (2013.01); *H02J 3/36* (2013.01)

(58) Field of Classification Search
CPC ....... G06F 1/163; G06F 1/1633; G06F 1/1628
See application file for complete search history.

(56) References Cited

U.S. PATENT DOCUMENTS 3,964,573 A * 6/1976 Wilson ...................... B66F 9/02
182/116
4,265,583 A 5/1981 Baird et al.
(Continued)

FOREIGN PATENT DOCUMENTS

CN 103354232 A 10/2013
JP 06-343267 A 12/1994
(Continued)

*Primary Examiner* — Hoa C Nguyen
*Assistant Examiner* — Christopher L Augustin
(74) *Attorney, Agent, or Firm* — Novick, Kim & Lee, PLLC; Jae Youn Kim

(57) ABSTRACT

The present invention relates to a module extraction apparatus of a high voltage direct current system. In the present invention, a fixed base (30) is secured to a structure (82), and a sub-module (10) is mounted on a movable base (60) that slides on the fixed base (30), thereby enabling the sub-module (10) to be extracted from the structure (82). The sub-module (10) may be separated into a power unit (12) and a capacitor unit (24) which may be separately extracted from the structure (82). A connection support (84) is connected to the fixed base (30) and installed to protrude toward the outside of the structure (82), and the tip end of the connection support (84) extending toward the outside of the structure (82) is supported by a wire (86). As described above, the present invention has an advantage of more easily extracting the module, which is a heavy object, from the structure (82) to carry out the maintenance thereof.

15 Claims, 6 Drawing Sheets

(51) Int. Cl.
H02J 1/00 (2006.01)
H02M 7/00 (2006.01)
H02B 11/173 (2006.01)
H02J 3/36 (2006.01)

(56) References Cited

U.S. PATENT DOCUMENTS

| | | | | |
|---|---|---|---|---|
| 4,821,150 A | * | 4/1989 | Duthie | H05K 7/1461 361/736 |
| 5,309,317 A | * | 5/1994 | Ishikawa | H05K 7/1421 200/325 |
| 6,590,151 B1 | * | 7/2003 | Merk | A47B 21/00 174/359 |
| 6,956,735 B2 | * | 10/2005 | Lee | G06F 1/16 211/134 |
| 7,307,835 B1 | * | 12/2007 | Barina | G06F 1/187 248/917 |
| 9,108,828 B2 | * | 8/2015 | Bolde | B66F 9/141 |
| 9,156,614 B2 | * | 10/2015 | Ono | H02B 3/00 |
| 2002/0084089 A1 | * | 7/2002 | Holt | H02B 1/308 174/50 |
| 2003/0221914 A1 | * | 12/2003 | Smith | B66F 9/122 187/244 |
| 2010/0172087 A1 | * | 7/2010 | Jeffery | G11B 33/02 361/679.33 |
| 2014/0055959 A1 | * | 2/2014 | Manda | G11B 33/128 361/728 |
| 2014/0084837 A1 | * | 3/2014 | Tio | H02P 6/14 318/519 |

FOREIGN PATENT DOCUMENTS

| | | |
|---|---|---|
| JP | 07-176687 A | 7/1995 |
| KR | 10-2013-0029761 A | 3/2013 |
| KR | 10-1288679 B1 | 7/2013 |

* cited by examiner

MODULE EXTRACTION APPARATUS OF HIGH VOLTAGE DIRECT CURRENT SYSTEM

TECHNICAL FIELD

The present invention relates to a module extraction apparatus of a high voltage direct current system and, more particularly, to a module extraction apparatus of a high voltage direct current system for extracting a submodule from a structure at a high place to maintain the submodule.

BACKGROUND ART

A HVDC (High Voltage Direct Current) system supplies power by converting AC power from a power plant into DC power, transmitting the DC power, and then inverting the DC power into AC power at a power receiving point. The HVDC system has a loss of power less than an AC transmission type, so it has high power transmission efficiency. Further, the system can improve stability through line separation and has small inductive disturbance, so it is advantageous in long-distance power transmission.

The HVDC system is installed in a structure called a converter module composed of a plurality of submodules stacked 10 meters high in a plurality of layers. The submodules each weigh 200 kg or more, so an aerial ladder is needed to maintain the submodules, which is troublesome. It is difficult to construct an overhead traveling crane in substation facilities including a converter module, so aerial ladders are generally used.

It is very dangerous and difficult work to move submodules that are heavy equipment located in high-rise structures using an aerial ladder. Aerial ladders are usually operated by hydraulic pressure, so even if the load capacity is set larger than the weight of a submodule, a sudden load applied by heavy equipment suddenly changes the center of gravity of the aerial ladders, thus causing safety risks.

Further, considering the weight of submodules, it is very difficult and dangerous for a worker to move the submodules in a structure using an aerial ladder. In particular, it is difficult and dangerous to take out a submodule, which is heavy equipment, on an aerial ladder.

DISCLOSURE

Technical Problem

An object of the present invention is to easily take out modules of a high voltage direct current system from a structure to maintain the modules.

Another object of the present invention is to stably take out modules of high voltage direct current system from a structure and put the modules on an aerial ladder.

Technical Solution

According to an aspect of the present invention, there is provided a module extraction apparatus of a high voltage direct current system for taking a module composed of a first part and a second part, which are separable from each other, out of a structure for the high voltage direct current system, the apparatus including: a fixed base having rails that longitudinally extend, and installed in the structure; a movable base fixing the first part and the second part and moving along the rails of the fixed base; and first part rails formed at a front portion of the movable base and guiding the first part separated from the second part and moving along both sides of the front portion of the movable base.

The rails may be disposed at both longitudinal sides of the fixed base and have a roller channel inside so that rollers on the movable base move in the roller channels.

Guide ribs may be formed inside the roller channels in the longitudinal direction of the roller channels and inserted in roller grooves formed around outer sides of the rollers.

A fixing plate may be formed at a front end of the fixed base and coupled to a front end member at a front end of the movable base, and a stopping wall may be formed at a rear end of the fixed base and coupled to a rear end member at a rear end of the movable base.

A handle is disposed on the front end member of the movable base.

Stopper holes may be formed at a side of each of the rails of the fixed base and at corresponding portions of the movable base so that when the movable base is moved on the fixed base and the module is slightly taken out, the movable base is prevented from moving by fitting stoppers into the stopper holes of the fixed base and the stopper holes of the movable base.

The first part may be a power unit and the second part may be a capacitor unit in the module.

Fixing holes may be formed at the first part rails and fasteners inserted in fastening holes at corresponding positions of the first part are fitted into the fixing holes so that the first part is fixed to the first part rails.

In order to take out the module, an extension bed may be mounted in the structure with a first end fixed close to the fixed base, and wires connected at first ends to a front end of the extension bed may be connected at second ends to the structure to hold the extension bed on a cage of an aerial ladder.

The roller channels formed at the rails at both sides of the fixed base may be open toward each other and the rollers moving along the roller channels may be disposed on outer surfaces of both opposite sides of roller skirts.

Advantageous Effects

It is possible to achieve the following effects from the module extraction apparatus of a high voltage direct current system according to the present invention.

According to the present invention, a submodule is mounted on a movable base that slides on a fixed base fixed in a structure and a power unit of the submodule is separated from a capacitor unit and slides on the movable base, so it is possible to easily take the submodule out of the structure.

Further, a separate extension bed is coupled to the fixed base to hold a submodule slid out on the movable base on an aerial ladder, so it is possible to put the submodule on the aerial ladder without changing the center of gravity of the aerial ladder, and accordingly, it is possible to more safely take out the submodule that is heavy equipment.

MODE FOR INVENTION

Figure 1:
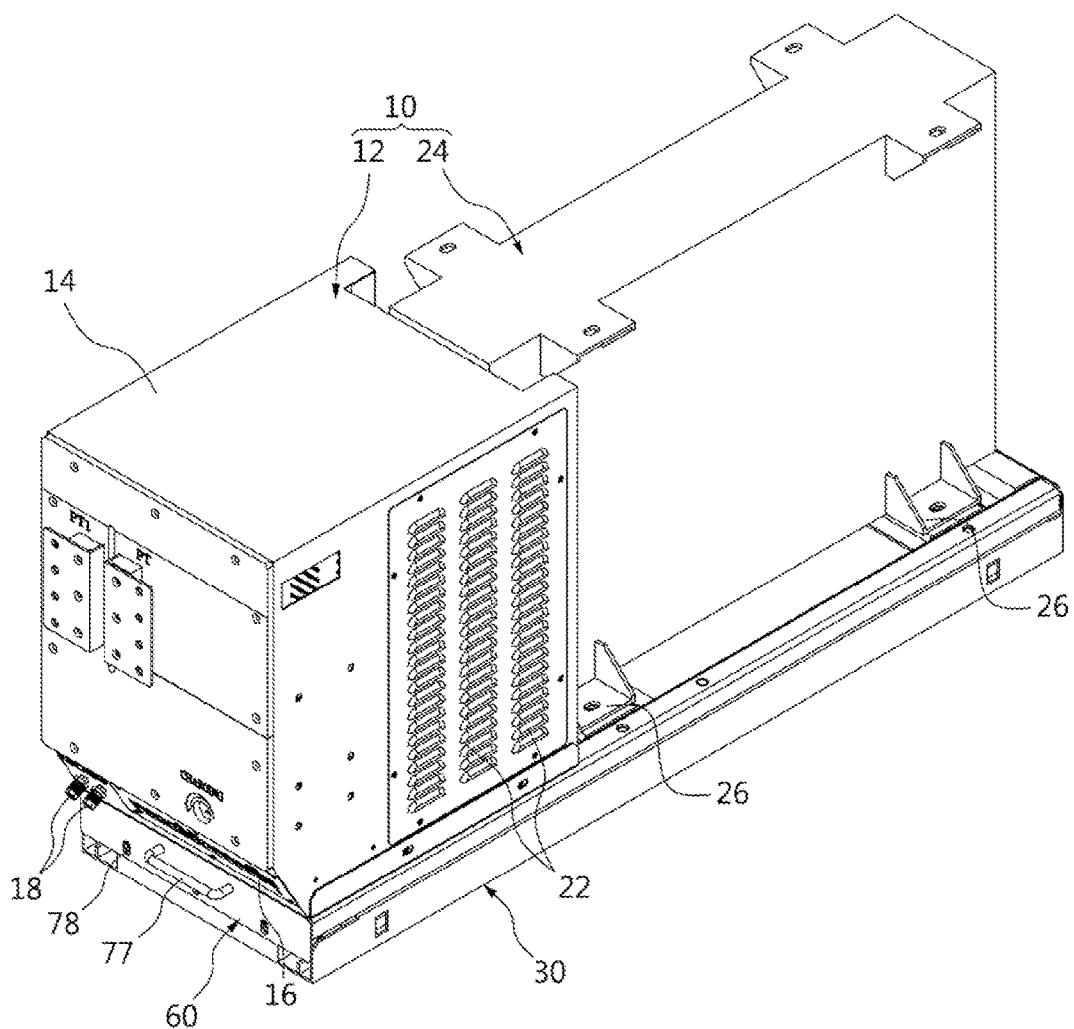
FIG. 1 is a perspective view showing the configuration of an embodiment of a module extraction apparatus of a high voltage direct current system according to the present invention.

An embodiment of a module extraction apparatus of a high voltage direct current system according to the present invention is described hereafter in detail with reference to the accompanying drawings. A submodule of modules of a high voltage direct current system is exemplified herein.

As shown in the figures, the apparatus for extracting submodules of this embodiment can slide out submodules that are heavy equipment from their positions for maintenance thereof. The submodule 10 is largely composed of a power unit 12 and a capacitor unit 24, and in this embodiment, the power unit 12 of the submodule 10 can be separated from the capacitor unit 24.

Various power semiconductors and various control boards are in the power unit 12. A power unit housing 14 forms the external shape of the power unit 12. In this embodiment, the power unit housing 14 has a substantially hexahedral shape. A display 16 is disposed at an angle at the front lower end of the power unit housing 14. That is, the front lower end of the power unit housing 14 is partially removed at an angle, so the surface is inclined downward. The display 16 is disposed on the inclined surface so that the state of the submodule 10 can be seen from the outside. Cooling water couplers 18 are disposed through the inclined surface, close to the display 16.

Fastening holes 20 are formed at the lower ends of both sides of the power unit housing 14 of the power unit 12. The fastening holes 20 are formed at positions corresponding to fixing holes 74 of power unit rails 72, which will be described below, in order that separate fasteners are fitted in the fixing holes 74 to fix the power unit 12 to a movable base 60. Reference numeral '22' indicates heat dissipation louvers, which allow air to flow between the inside and outside of the power unit 12.

A plurality of mounting brackets 26 is fastened to the capacitor unit 24. The mounting brackets 26 are provided for fixing to the movable base 60, which will be described below. The mounting brackets 26 are disposed at the upper end and lower end of the outer sides of the capacitor unit 24.

A plurality of signal connectors 28 is formed on the front of the capacitor unit 24. Signals and power are transmitted to the power unit 12 through the signal connectors 28. Six signal connectors 28 are provided in this embodiment, but the number depends on design. The submodule 10 is installed in a structure 82 shown in FIG. 6.

Figure 2:
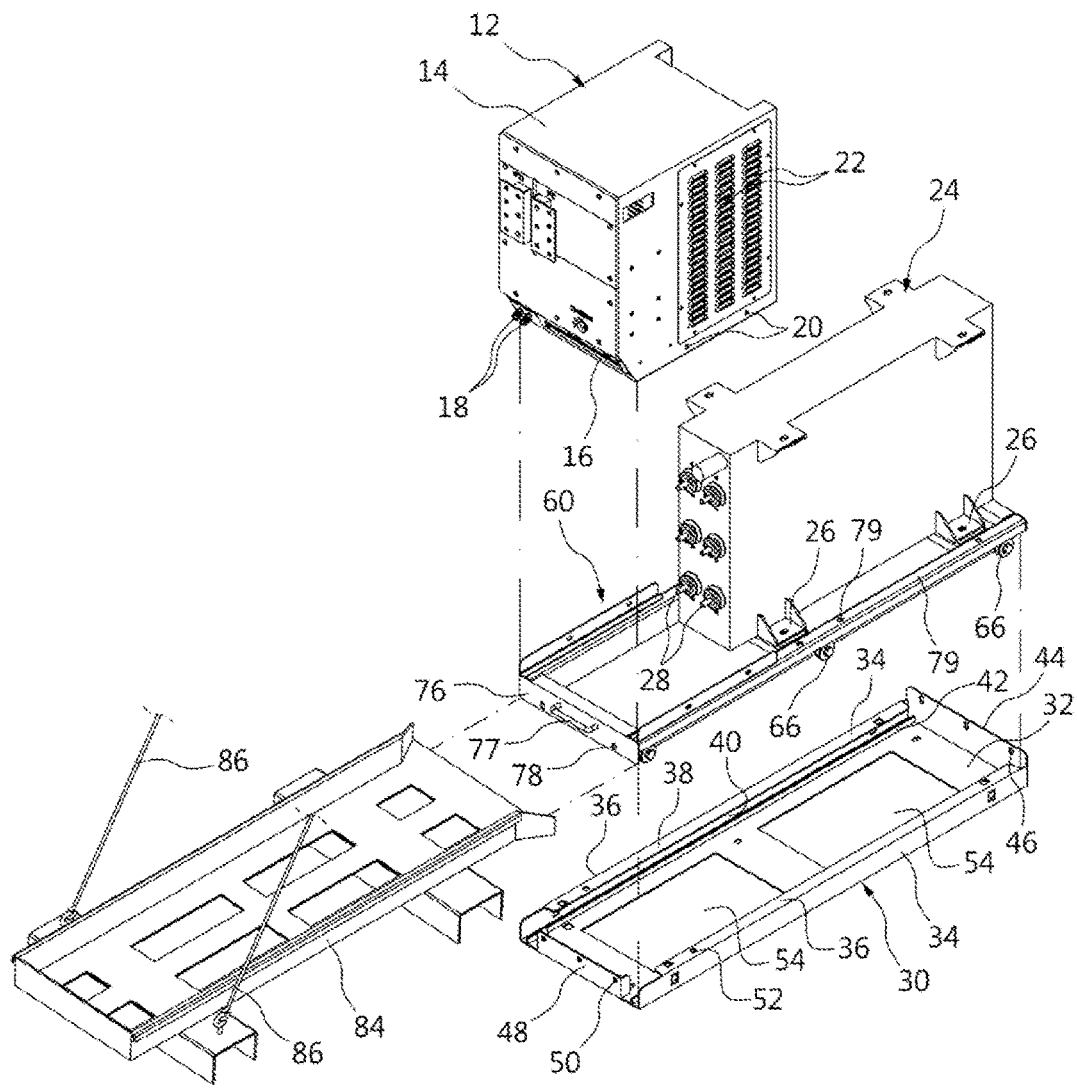
FIG. 2 is an exploded perspective view showing the configuration of an embodiment of the present invention.
Figure 3:
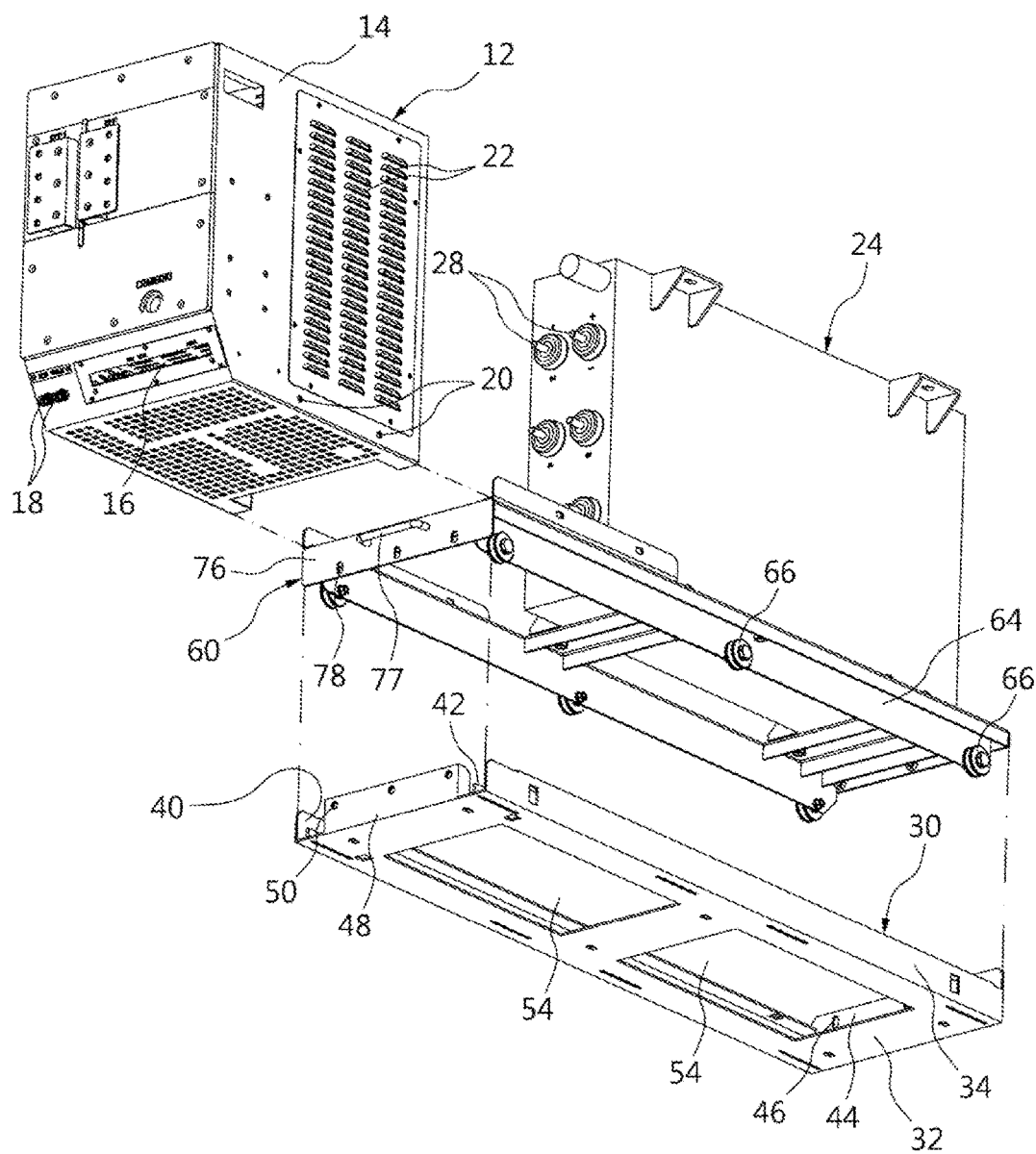
FIG. 3 is an exploded perspective view showing a configuration of an embodiment of the present invention from under the bottom.

A configuration for extracting the submodule 10 is described hereafter. First, a fixed base 30 is fixed on each floor of a structure 82 that is a fixed facility. The fixed base 30 is shown in detail in FIGS. 2 and 3 and has a rectangular shape extending in a direction.

The fixed base 30 is formed by machining a metal plate, for example, machining a sheet of metal plate into a predetermined shape using a press. The metal plate of the fixed base 30 becomes a fixed base body 32. The fixed base body 32 forms the frame of the fixed base 30.

The rails 34 extend along both sides of the fixed base body 32. Rollers 66 of the movable base 60, which will be described below, are guided along the rails 34. Side walls 36 are formed at a side of each of the rails 34. The side walls 36 longitudinally extend along both sides of the fixed base body 32. Upper walls 38 extend a predetermined width perpendicularly from the upper ends of the side walls 36. The upper walls 38, the side walls 36, and the bottom of the fixed base body 32 form roller channels 40. The rollers 66 to be described below move along the roller channels 40. The roller channels 40 are open to each other at the rails 34 at both sides.

Guide ribs 42 extending along the roller channel 40 are disposed inside the roller channels 40. The guide ribs 42 limit the path of the roller 60 to be described below. The guide ribs 42 are formed in the shape of a plate extending along the roller channels 40.

A stopping wall 44 is formed at the rear end of the fixed base 30. The stopping wall 44 is formed perpendicularly at the rear end of the fixed base body 32 to limit movement of the movable base 60, which will be described blow, and fix the movable base to the fixed base 30. A plurality of fastening holes 46 is formed through the stopping wall 44. Fasteners are fitted in a rear end member 80 of the movable base 60, which will be described below, through the fastening holes 46 to fasten the movable base 60 to the fixed base 30.

A fixing plate 48 is formed at the front end of the fixed base 30. The fixing plate 40 is also formed perpendicularly to the fixed base body 32. Fastening holes 50 are formed through the fixing plate 48, so the fasteners inserted through the fastening holes 48 are fitted in the fastening holes 78 of a front end member 76 of the movable base 60 to be described below.

A stopping wall hole 52 is formed at a side of the upper walls 38 of the rails 34 of the fixed base 30. Stoppers (not shown) are separably fitted in the stopper holes 52. The stoppers are fitted in the stopper holes 52 and stopper holes 79 of the movable base 60, which will be described below, in order to prevent the movable base 60 from freely moving along the rails 34 when the movable base 60, which will be described below, is unfixed from the fixed base 30.

Reference numeral '54' indicates openings of the fixed base body 32. The openings 54 are formed by cutting off portions that are not necessary for the structure and strength of the fixed base body 32.

The movable base 60 moves along the fixed base 30. The movable base 60 occupies the same area as the fixed base 30 when seen from above. The movable base body 62 forms the frame of the movable base 60. The movable base body 62 is formed by combining members that have U-shaped or rectangular cross-sections because the movable base body 62 needs to be strong enough for supporting the load of the power unit 10 and the capacitor unit 24.

Roller skirts 64 are formed along both sides of the movable base body 62. The roller skirts 64 longitudinally extend at both sides of the movable base body 62 and protrude a predetermined distance downward from the movable base body 62. The rollers 66 are rotatably mounted on the roller skirts 64. Three rollers 66 are disposed on each side, that is, a total of six rollers 66 are provided in this embodiment. In particular, the rollers 66 are arranged at the front end, the rear end, and the middle portion in the longitudinal direction of the roller skirt 64. The rollers 66 are mounted on the outer surfaces of both opposite sides of the roller skirts 64. This is for allowing the rollers 66 to move in the roller channels 66 without interference by other parts because the roller channels 40 are open toward each other.

Figure 4:
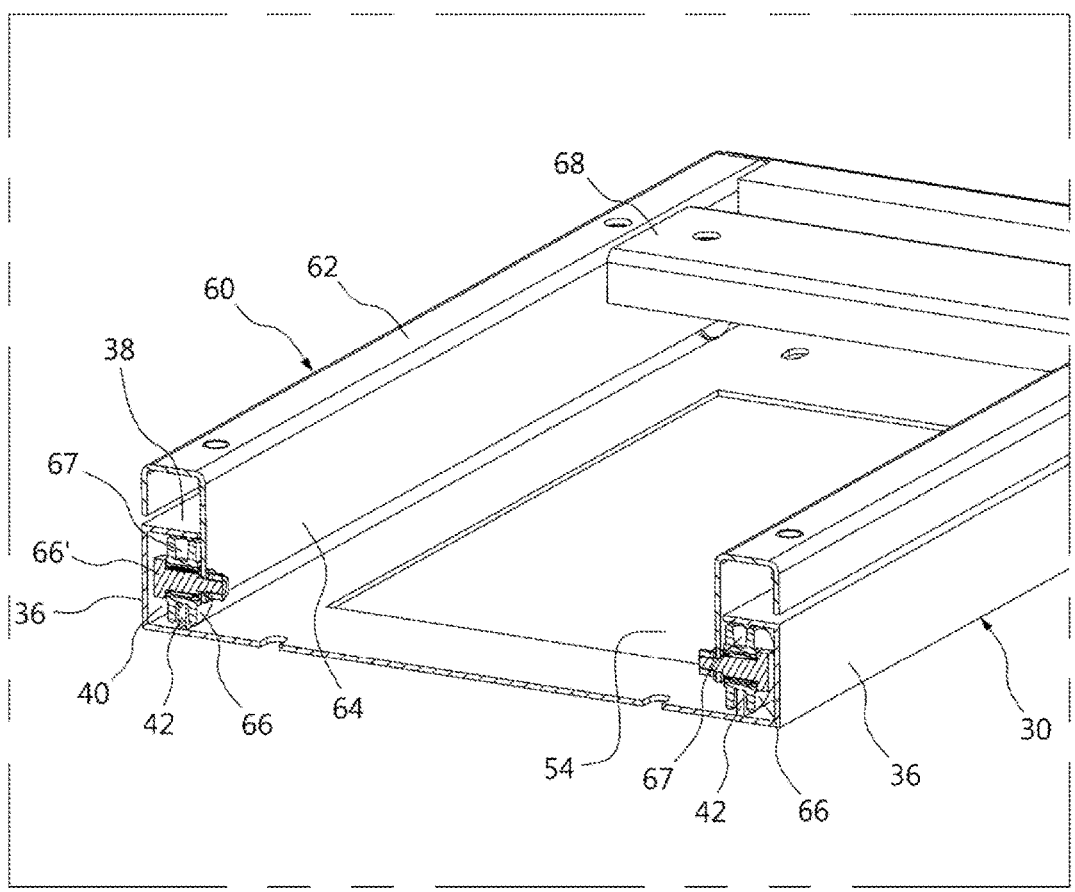
FIG. 4 is a partial cross-sectional view showing a main configuration of an embodiment of the present invention.
Figure 5:
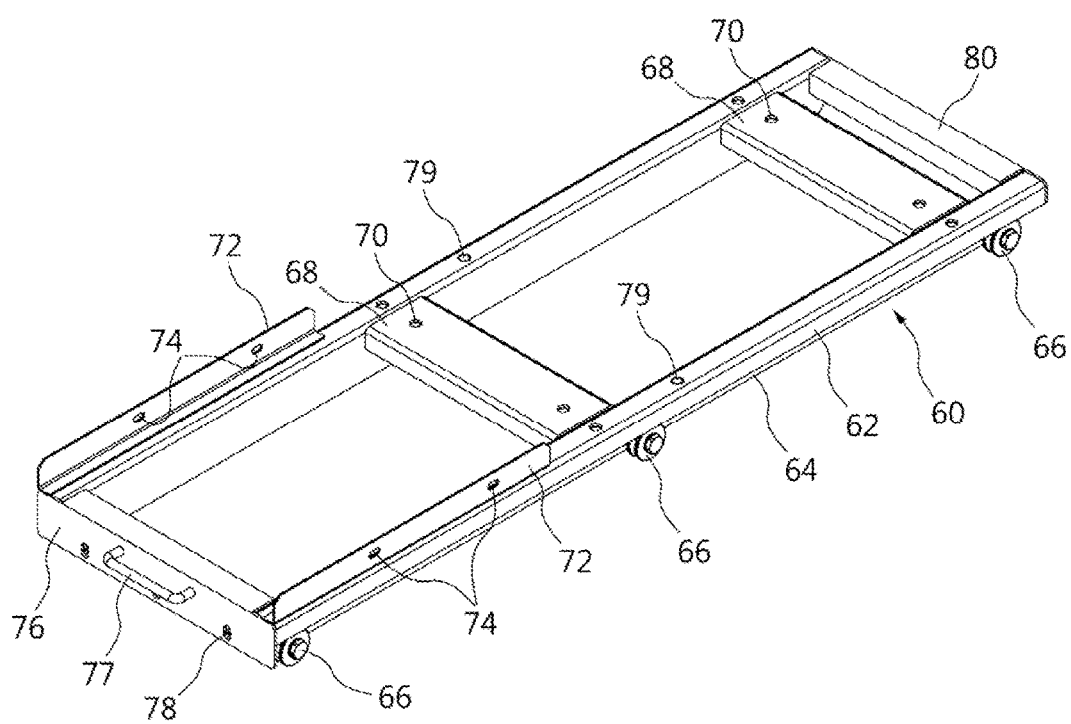
FIG. 5 is a perspective view showing a movable base of an embodiment of the present invention.

The rollers 66, as shown in FIG. 4, can rotate about roller shafts 66' disposed in the roller skirts 63. A roller groove 67 is formed on the outer side of the rollers 66. The roller groove 67 is formed around the center portion of the outer side of the rollers 66. The guide ribs 42 of the fixed base 30 are in the roller grooves 67. As the guide ribs 42 are in the roller grooves 67, an accurate path of the rollers 66 can be made.

The movable base body 62 has capacitor mounts 68. The capacitor mounts 68 are two bars transversely coupled to the movable base body 62. Fastening holes 70 are formed in the capacitor mounts 68.

Power unit rails 72 are formed at the front portion of the movable base body 62. The power unit rails 72 have an L-shaped cross-section in this embodiment. The power unit rails 72 guide the power unit 12 sliding on the movable base 60. Further, the power unit 12 is fixed to the power rails 72. To this end, fixing holes 74 are formed at the power unit rails 72. One power unit rail 72 is formed at each side of the front portion of the movable base body 62. This is for guiding both sides of the power unit 12.

The front end member 76 is disposed at the front end of the movable base body 62 where the power unit rails 72 are disposed. The front end member 76 is coupled to the fixing plate 48 of the fixed base 30.

To this end, the fastening holes 78 are formed at positions corresponding to the fastening holes 50 of the fixing plate 48. A handle 77 is disposed at the front end member 76. The handle 77 is used for a worker to move the movable base 60 with respect to the fixed base 30. Obviously, moving the movable base 60 means moving the submodule 10.

Stopper holes 79 are formed at the movable base body 62. When the stopper holes 79 are positioned to meet the stopper holes 52 of the fixed base 30, the stoppers are inserted into the stopper holes 70 so that the movable base 60 is fixed to the fixed base 30.

The rear end member 80 is formed at the rear end of the movable base body 62. The rear end member 80 is coupled to the stopping wall 44 of the fixed base 30. To this end, fastening holes (not shown) are formed at the rear end member 80, at positions corresponding to the fastening holes 46 of the stopping wall 44.

Figure 6:
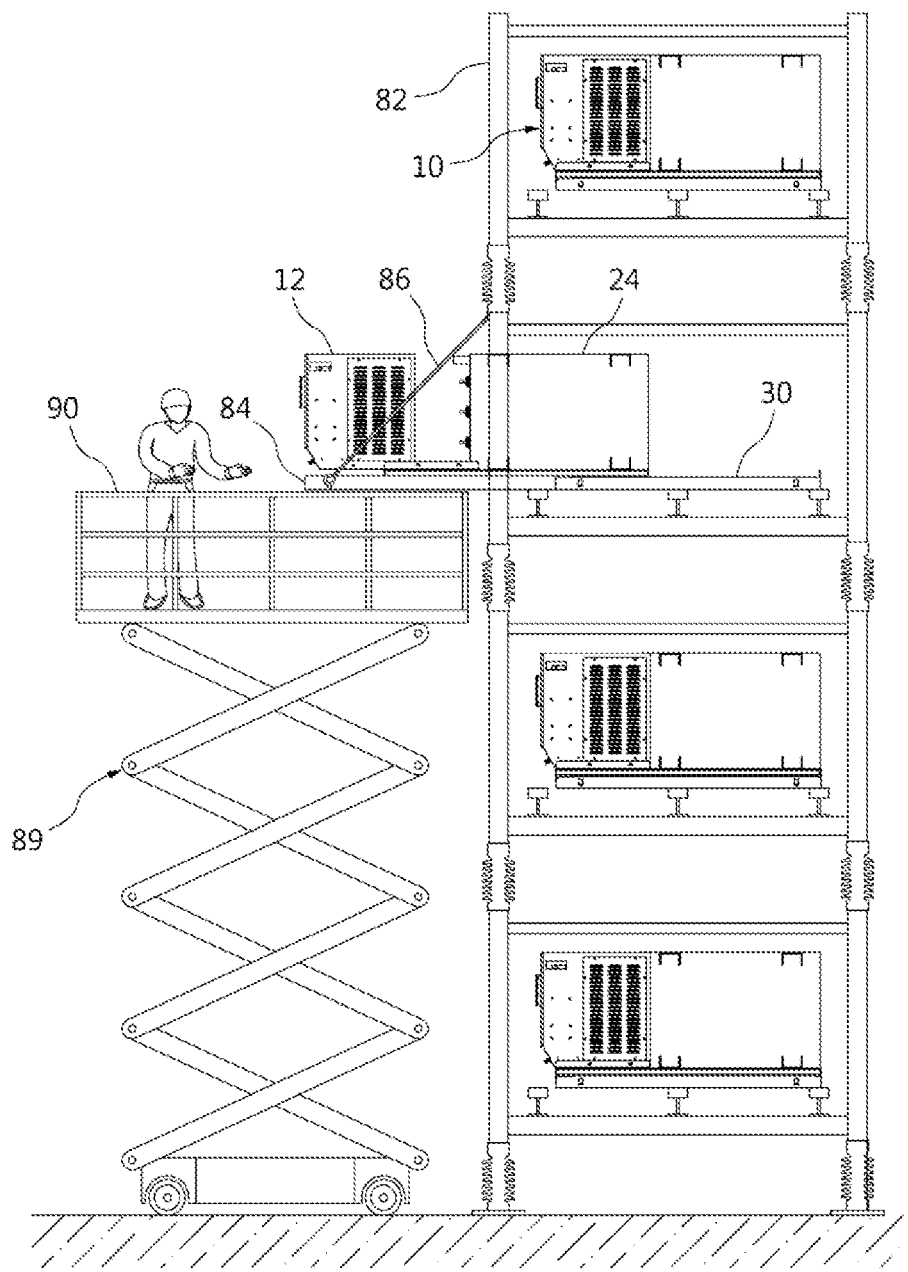
FIG. 6 is a view showing the operation of extracting a submodule using an extraction apparatus of an embodiment of the present invention.

The fixed base 30 and the movable base 60 that have the configurations described above are installed on each floor of the structure 82 shown in FIG. 6. The submodule 10 is mounted on each of the movable bases 60, so when the movable base 60 slides out on the fixed base, the submodule 10 can be taken out of the structure 82.

Further, an extension bed 84 is provided in the preset invention so that the submodule 10 taken out of the structure 82 can be put on a cage 90 of an aerial ladder 88. The extension bed 84 is installed with one end fixed close to the fixed base 30 in the structure 82 and the other end protruding from the structure 82. The extension bed 84 is installed with the top at the same height as the top of the movable base 60 so that the submodule 10 can be easily taken out.

The portion protruding from the structure 82 of the extension bed 84 is connected to the structure 82 by wires 86. As shown in FIG. 6, one end of the wire 86 is connected to the front end of the extension bed 84 and the other end is connected to the structure 82. The wires 86 are installed at an angle and hold the extension bed 84 to the structure 82.

The extension bed 84 is installed at a height around the chest of a worker in the cage 90 at the upper end of the aerial ladder 88.

Use of the module extraction apparatus for a high voltage direct current system according to the present invention having the configuration described above is described in detail hereafter.

In this embodiment, fixed bases 30 are fixed in the structure 82. The structure 82 is about 10 m high and has several stories, and a submodule 10 is installed in each story. To this end, a fixed base 30 is installed in each story of the structure 82.

The movable base 60 is movably mounted on the fixed base 30 and guided along the rails 34 of the fixed base 30. The submodule 10 is mounted on the movable base 60. The power unit 12 and the capacitor unit 24 of the submodule 10 are separable and mounted on the movable base 60. The power unit 12 is fastened to the movable base 60 by fitting fasteners into fastening holes 20 and the fixing holes 74 of the power unit rails 72. The capacitor unit 24 is fastened by fitting fasteners into the mounting holes 70.

The movable base 60 is movably mounted on the fixed base 30 and then fastened to the fixed base 30. That is, the front end member 76 of the movable base 60 is fastened to the fixing plate 48 of the fixed base 30 and the rear end member 80 of the movable base 60 is fastened to the stopper wall 44 of the fixed base 30, whereby the movable base 60 is fastened and fixed to the fixed base 30. Accordingly, the submodule 10 is also fixed to the fixed base 30.

A process of taking the submodule 10 out of the structure 82 for maintenance is described hereafter. First, the extension bed 84 is mounted in a story of the structure 82 where a desired submodule 10 is located. One end of the extension bed 84 is fixed close to the fixed base 30, the wires 86 are connected to the other end of the extension bed 84, and the other ends of the wires 86 are fixed to the structure.

In order to take out the submodule 10, the movable base 60 is unfixed from the fixed base 30 and then moved on the fixed base 30. That is, the front end member 76 and the fixing plate 48 are separated and the rear end member 80 and the stopping wall 44 are separated so that the movable base 60 can be moved on the fixed base 30. Accordingly, the submodule 10 is slightly taken out of the structure 82.

In order to fully take the submodule 10 out of the structure 82, the movable base 60 is moved to the front end of the rails 34 of the fixed base 30 and the submodule 10 is moved along the extension bed 84, whereby the submodule 10 can be fully taken out and put on the cage 90 of the aerial ladder 88. Since the extension bed 84 protrudes from the structure 82, the front end of the extension bed 84 extends up to the center of the cage 90. Accordingly, when the submodule 10 is put on the cage 90, force that makes the aerial ladder unstable is not applied.

On the other hand, it may be required to repair the entire submodule 10, but the power unit 12 usually breaks, so only the power unit 12 is taken out in most cases. In order to separate only the power unit 12 from the movable base 60, the movable base 60 is temporarily combined with the fixed base 30. To this end, the stopper holes 52 of the fixed base 30 are aligned with the stopper holes 79 of the movable base 60 and then stoppers are fitted into the stopper holes 52 and 79. Accordingly, the movable base 60 is temporarily fixed to the fixed base 30.

When the movable base 60 is temporarily fixed to the fixed base 30, the fasteners that fix the power unit 12 to the power unit rails 72 are separated. After being unfixed from the power unit rails 72, the power unit 12 is moved along the power unit rails 72. The power unit 12 moving along the power unit rails 72 is put on the extension bed 84 and then moved to the cage 90 of the aerial ladder 88. Thereafter, the power unit 12 placed on the cage 90 is moved down to the ground.

Meanwhile, the power unit 12 or the submodule 10 that has been repaired is mounted on the movable base 60 in opposite order to the process described above, the movable base 60 is moved to the fixed base 30, and then it is fixed to the movable base 30.

The above description is an example that explains the spirit of the present invention and may be changed and modified in various ways without departing from the basic features of the present invention by those skilled in the art. Accordingly, the embodiment described herein are provided not to limit, but to explain the spirit of the present invention and the spirit and the scope of the present invention are not limited by the embodiments. The protective range of the present disclosure should be construed on the basis of claims and all the technical spirits in the equivalent range should be construed as being included in the scope of the right of the present disclosure.

For reference, although a submodule 10 composed of the power unit 12 and the capacitor unit 24 was exemplified as a module in the embodiment shown in the figures, it may be considered to replace the power unit 12 and the capacitor unit 24 with a first part and a second part, respectively.

Further, although the rollers 66 of the movable base 60 are moved on the rails 34 of the fixed base 30 in the embodiment described above, the rollers 66 are not necessary and corresponding portions of the movable base 60 may be designed to slide on the rails 34.

The invention claimed is:

1. A module extraction apparatus of a high voltage direct current system for taking out a module composed of a first part and a second part, which are separable from each other, from a structure for the high voltage direct current system, the apparatus comprising:
    a fixed base having rails that longitudinally extend, and installed in the structure;
    a movable base fixing the first part and the second part and moving along the rails of the fixed base; and
    first part rails formed at a front portion of the movable base and guiding the first part separated from the second part and moving along both sides of the front portion of the movable base,
    wherein fixing holes are formed at the first part rails, and fasteners inserted in fastening holes at corresponding positions of the first part are fitted into the fixing holes so that the first part is fixed to the first part rails.

2. The apparatus of claim 1, wherein the rails are disposed at both longitudinal sides of the fixed base and have a roller channel inside so that rollers on the movable base move in the roller channels.

3. The apparatus of claim 2, wherein guide ribs are formed inside the roller channels in the longitudinal direction of the roller channels and are inserted in roller grooves formed around outer sides of the rollers.

4. The apparatus of claim 1, wherein a fixing plate is formed at a front end of the fixed base and coupled to a front end member at a front end of the movable base, and a stopping wall is formed at a rear end of the fixed base and coupled to a rear end member at a rear end of the movable base.

5. The apparatus of claim 4, wherein a handle is disposed on the front end member of the movable base.

6. The apparatus of claim 1, wherein stopper holes are formed at a side of each of the rails of the fixed base and at corresponding portions of the movable base so that when the movable base is moved on the fixed base and the module is slightly taken out, the movable base is prevented from moving by fitting stoppers into the stopper holes of the fixed base and the stopper holes of the movable base.

7. The apparatus of claim 1, wherein the first part is a power unit and the second part is a capacitor unit in the module.

8. The apparatus of claim 1, wherein in order to take out the module, an extension bed is mounted in the structure with a first end fixed close to the fixed base and wires connected at first ends to a front end of the extension bed are connected at second ends to the structure to hold the extension bed on a cage of an aerial ladder.

9. The apparatus of claim 2, wherein the roller channels formed at the rails at both sides of the fixed base are open toward each other and the rollers moving along the roller channels are disposed on outer surfaces of both opposite sides of roller skirts.

10. The apparatus of claim 2, wherein in order to take out the module, an extension bed is mounted in the structure with a first end fixed close to the fixed base and wires connected at first ends to a front end of the extension bed are connected at second ends to the structure to hold the extension bed on a cage of an aerial ladder.

11. The apparatus of claim 3, wherein in order to take out the module, an extension bed is mounted in the structure with a first end fixed close to the fixed base and wires connected at first ends to a front end of the extension bed are connected at second ends to the structure to hold the extension bed on a cage of an aerial ladder.

12. The apparatus of claim 4, wherein in order to take out the module, an extension bed is mounted in the structure with a first end fixed close to the fixed base and wires connected at first ends to a front end of the extension bed are connected at second ends to the structure to hold the extension bed on a cage of an aerial ladder.

13. The apparatus of claim 5, wherein in order to take out the module, an extension bed is mounted in the structure with a first end fixed close to the fixed base and wires connected at first ends to a front end of the extension bed are connected at second ends to the structure to hold the extension bed on a cage of an aerial ladder.

14. The apparatus of claim 6, wherein in order to take out the module, an extension bed is mounted in the structure with a first end fixed close to the fixed base and wires connected at first ends to a front end of the extension bed are connected at second ends to the structure to hold the extension bed on a cage of an aerial ladder.

15. The apparatus of claim 7, wherein in order to take out the module, an extension bed is mounted in the structure with a first end fixed close to the fixed base and wires connected at first ends to a front end of the extension bed are connected at second ends to the structure to hold the extension bed on a cage of an aerial ladder.

* * * * *